US011341671B2

United States Patent
Lu et al.

(10) Patent No.: US 11,341,671 B2
(45) Date of Patent: May 24, 2022

(54) VEHICULAR DRIVER MONITORING SYSTEM

(71) Applicant: Magna Electronics Inc., Auburn Hills, MI (US)

(72) Inventors: Yuesheng Lu, Farmington Hills, MI (US); Steven V. Byrne, Goodrich, MI (US); Gregory A. Janik, Farmington Hills, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 233 days.

(21) Appl. No.: 16/668,035

(22) Filed: Oct. 30, 2019

(65) Prior Publication Data

US 2020/0143560 A1 May 7, 2020

Related U.S. Application Data

(60) Provisional application No. 62/885,983, filed on Aug. 13, 2019, provisional application No. 62/754,089, filed on Nov. 1, 2018.

(51) Int. Cl.
*G06T 7/73* (2017.01)
*B60R 1/00* (2022.01)
(Continued)

(52) U.S. Cl.
CPC ............... *G06T 7/73* (2017.01); *B60R 1/00* (2013.01); *B60W 40/08* (2013.01); *G06T 7/557* (2017.01);
(Continued)

(58) Field of Classification Search
CPC .. G06T 7/73; G06T 7/557; B60R 1/00; B60R 2300/303; B60W 40/08; B60W 2420/403;
(Continued)

(56) References Cited

U.S. PATENT DOCUMENTS 4,712,879 A 12/1987 Lynam et al.
5,073,012 A 12/1991 Lynam
(Continued)

FOREIGN PATENT DOCUMENTS

DE 102017205386 A1 * 10/2018 ......... G06K 9/00228

OTHER PUBLICATIONS

CCS Inc., "Band-Pass Filters for Machine Vision Camera Lenses", Jan. 19, 2018, pp. 1-2. (Year: 2018).*

*Primary Examiner* — Nay A Maung
*Assistant Examiner* — Daniella M. DiGuglielmo
(74) *Attorney, Agent, or Firm* — Honigman LLP

(57) ABSTRACT

A vehicular driver monitoring system includes an illumination source that emits non-visible light that illuminates at least a portion of a driver of the vehicle, a reflector disposed at the vehicle and within a line of sight of the illuminated portion of the driver, a camera disposed in the vehicle and having a field of view that encompasses the reflector, and a control having an image processor that processes image data captured by the camera. The reflector reflects at least some non-visible light and allows visible light to pass through. The camera captures image data representative of the non-visible light emitted by the illumination source that reflects off the illuminated portion of the driver of the vehicle and reflects off the reflector so as to be directed toward the camera. The control, responsive to processing of image data captured by the camera, monitors the illuminated portion of the driver.

17 Claims, 10 Drawing Sheets

(51) Int. Cl.
*G06T 7/557* (2017.01)
*B60W 40/08* (2012.01)
*G06V 20/59* (2022.01)
*G06V 40/19* (2022.01)
*G06V 10/145* (2022.01)

(52) U.S. Cl.
CPC ............ *G06V 20/597* (2022.01); *G06V 40/19* (2022.01); *B60R 2300/303* (2013.01); *B60W 2040/0818* (2013.01); *B60W 2040/0863* (2013.01); *B60W 2420/403* (2013.01); *B60W 2420/42* (2013.01); *B60W 2540/225* (2020.02); *G06V 10/145* (2022.01)

(58) Field of Classification Search
CPC . B60W 2040/0863; B60W 2040/0818; B60W 2540/225; B60W 2420/42; G06K 9/00604; G06K 9/2036; G06K 9/00845; G06V 20/597; G06V 40/19; G06V 10/145
USPC ........................................................ 382/100
See application file for complete search history.

(56) References Cited

U.S. PATENT DOCUMENTS

| | | | |
|---|---|---|---|
| 5,076,673 A | 12/1991 | Lynam et al. | |
| 5,115,346 A | 5/1992 | Lynam | |
| 5,140,455 A | 8/1992 | Varaprasad et al. | |
| 5,142,407 A | 8/1992 | Varaprasad et al. | |
| 5,151,816 A | 9/1992 | Varaprasad et al. | |
| 5,253,109 A | 10/1993 | O'Farrell et al. | |
| 5,406,414 A | 4/1995 | O'Farrell et al. | |
| 5,525,264 A | 6/1996 | Cronin et al. | |
| 5,550,677 A | 8/1996 | Schofield et al. | |
| 5,567,360 A | 10/1996 | Varaprasad et al. | |
| 5,610,756 A | 3/1997 | Lynam et al. | |
| 5,668,663 A | 9/1997 | Varaprasad et al. | |
| 5,670,935 A | 9/1997 | Schofield et al. | |
| 5,724,187 A | 3/1998 | Varaprasad et al. | |
| 5,910,854 A | 6/1999 | Varaprasad et al. | |
| 5,949,331 A | 9/1999 | Schofield et al. | |
| 6,002,511 A | 12/1999 | Varaprasad et al. | |
| 6,154,306 A | 11/2000 | Varaprasad et al. | |
| 6,178,034 B1 | 1/2001 | Allemand et al. | |
| 6,498,620 B2 * | 12/2002 | Schofield ............... B60N 2/002 348/118 | |
| 6,690,268 B2 | 2/2004 | Schofield et al. | |
| 7,184,190 B2 | 2/2007 | McCabe et al. | |
| 7,195,381 B2 | 3/2007 | Lynam et al. | |
| 7,255,451 B2 | 8/2007 | McCabe et al. | |
| 7,274,501 B2 | 9/2007 | McCabe et al. | |
| 7,626,749 B2 | 12/2009 | Baur et al. | |
| 7,914,187 B2 | 3/2011 | Higgins-Luthman et al. | |
| 8,725,311 B1 | 5/2014 | Breed | |
| 9,405,120 B2 | 8/2016 | Graf et al. | |
| 2003/0142041 A1 | 7/2003 | Barlow et al. | |
| 2003/0201895 A1 | 10/2003 | Harter et al. | |
| 2006/0098166 A1 | 5/2006 | Scharenbroch et al. | |
| 2006/0287779 A1 | 12/2006 | Smith et al. | |
| 2010/0245093 A1 | 9/2010 | Kobetski et al. | |
| 2012/0268582 A1 | 10/2012 | Rothenhausler | |
| 2014/0218529 A1 | 8/2014 | Mahmoud et al. | |
| 2014/0232869 A1 | 8/2014 | May et al. | |
| 2014/0336876 A1 | 11/2014 | Gieseke et al. | |
| 2015/0009010 A1 | 1/2015 | Biemer | |
| 2015/0015710 A1 | 1/2015 | Tiryaki | |
| 2015/0022664 A1 | 1/2015 | Pflug et al. | |
| 2015/0092042 A1 | 4/2015 | Fursich | |
| 2015/0124068 A1 * | 5/2015 | Madau ................... G06K 9/209 348/77 | |
| 2015/0156383 A1 | 6/2015 | Biemer et al. | |
| 2015/0232030 A1 * | 8/2015 | Bongwald .......... G02B 27/0093 348/115 | |
| 2015/0294169 A1 * | 10/2015 | Zhou ....................... G06F 3/013 348/148 | |
| 2015/0296135 A1 | 10/2015 | Wacquant et al. | |
| 2015/0352953 A1 | 12/2015 | Koravadi | |
| 2016/0137126 A1 | 5/2016 | Fursich et al. | |
| 2016/0150218 A1 * | 5/2016 | Yoon .................. G06K 9/00845 348/77 | |
| 2016/0209647 A1 | 7/2016 | Fursich | |
| 2017/0274906 A1 | 9/2017 | Hassan et al. | |

\* cited by examiner

VEHICULAR DRIVER MONITORING SYSTEM

CROSS REFERENCE TO RELATED APPLICATIONS

The present application claims priority of U.S. provisional application Ser. No. 62/885,983, filed Aug. 13, 2019, and U.S. provisional application Ser. No. 62/754,089, filed Nov. 1, 2018, which are hereby incorporated herein by reference in their entireties.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides a driver assistance system or vision system or imaging system for a vehicle that utilizes one or more cameras to capture image data representative of images interior of the vehicle, and provides an illumination source that emits non-visible light that illuminates at least a portion of a driver of the vehicle. A specular-selective reflector is disposed at the vehicle windshield and within a line of sight of the illuminated portion of the driver. The reflector reflects at least some non-visible light (such as infrared (IR) and/or near-infrared (NIR) radiation) incident at the reflector and allows visible light to pass through the reflector and the windshield, so as to direct the emitted non-visible light toward the driver, while allowing the driver to view through the reflector at the windshield. The camera is disposed in the dashboard of the vehicle and has a field of view that is directed away from the driver and that includes or encompasses the reflector. A control includes an image processor operable to process image data captured by the camera. The camera is sensitive to non-visible (IR/NIR) light and captures non-visible light that is emitted by the illumination source and that reflects off the illuminated portion of the driver of the vehicle and that reflects off the reflector so as to reflect toward the camera. The control, responsive to image processing of image data captured by the camera, monitors the illuminated portion of the driver.

These and other objects, advantages, purposes and features of the present invention will become apparent upon review of the following specification in conjunction with the drawings.

DESCRIPTION OF THE PREFERRED EMBODIMENTS

A vehicle vision system and/or driver assist system and/or object detection system and/or alert system operates to capture images exterior and/or interior of the vehicle and may process the captured image data to monitor occupants of the vehicle and/or display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide display, such as a rearview display or a top down or bird's eye or surround view display or the like.

Figure 1:
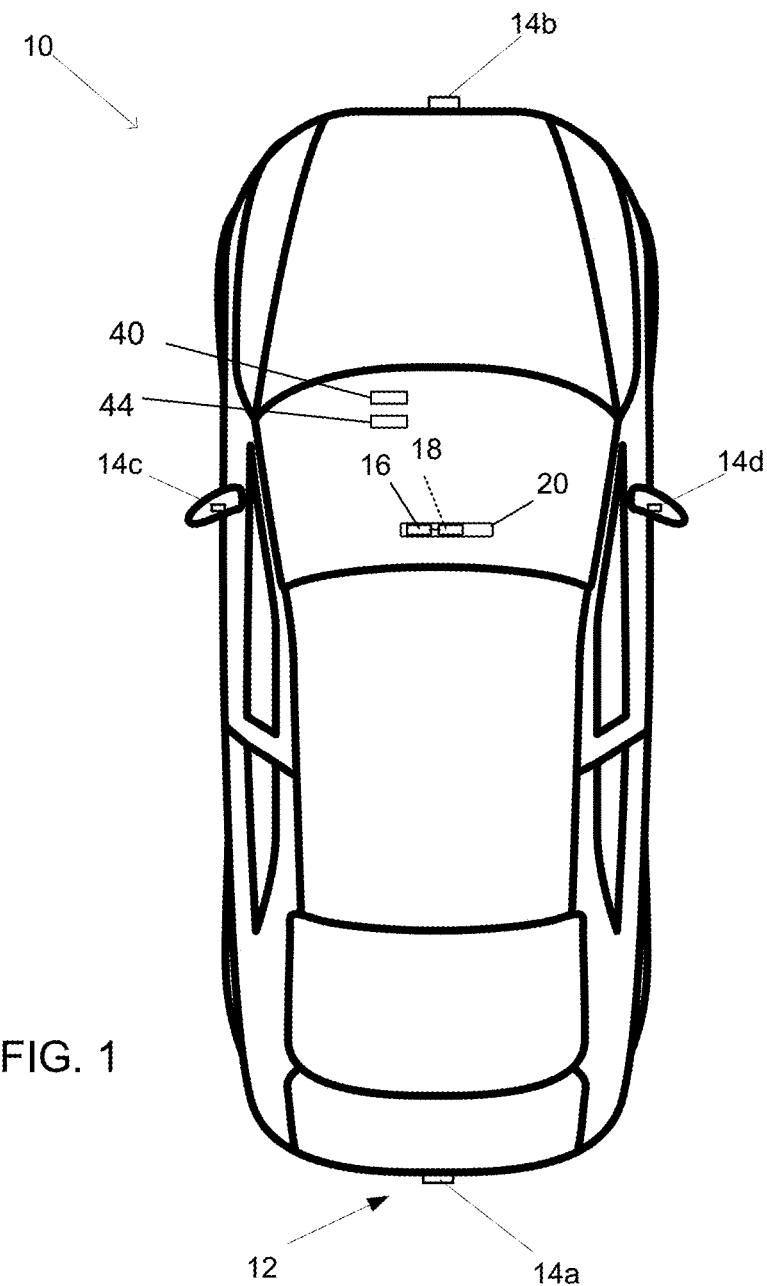
FIG. 1 is a plan view of a vehicle with a driver monitoring system that incorporates cameras in accordance with the present invention.

Referring now to the drawings and the illustrative embodiments depicted therein, a vehicle 10 includes an imaging system or vision system 12 that may include at least one exterior viewing imaging sensor or camera, such as a rearward viewing imaging sensor or camera 14*a* (and the system may optionally include multiple exterior viewing imaging sensors or cameras, such as a forward viewing camera 14*b* at the front (or at the windshield) of the vehicle, and a sideward/rearward viewing camera 14*c*, 14*d* at respective sides of the vehicle), which captures images exterior of the vehicle, with the camera having a lens for focusing images at or onto an imaging array or imaging plane or imager of the camera (FIG. 1). The system 12 may include at least one interior camera. For example, a forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like). The vision system 12 includes a control or electronic control unit (ECU) or processor 18 that is operable to process image data captured by the camera or cameras and may detect objects or the like and/or provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

The system may also or otherwise include a driver monitoring camera 44 that captures image data representative of the driver's head. The camera is, for example, disposed at a dashboard or instrument panel of the vehicle and has the principal axis of its field of view directed toward a portion of the windshield where a reflector 40 is disposed. The reflector comprises a thin transparent film or coating or a stack of thin films or coatings deposited on a transparent plastic substrate that can be configured to conform to the curvature of the in-cabin surface of the windshield portion when it is disposed at the windshield portion. The reflector reflects infrared (IR) or near-infrared (NIR) light incident at the reflector/windshield portion and allows visible light to pass through the reflector and the windshield portion (so that the driver can view through the windshield at the reflector). For example, a multi-layer stack of dielectric coatings may be utilized. The IR/NIR light present at the driver's head region is imaged by the camera 15 for a driver monitoring system via reflection of the IR/NIR light off the reflector 40, as discussed in detail below.

Driver monitoring systems may be used to track the head and eyes of the driver of a vehicle. To accurately track the eyes of the driver, the pupils of the eyes must be clearly viewed by a camera or other imaging device. Because of this, a preferred camera position is directly in front of the driver and at or below a line-of-sight to the road. This allows the camera to view both pupils in most situations and also avoid having the driver's eyelashes in the way (which is a problem that occurs when cameras are mounted above the line-of-sight to the road).

Figure 2:
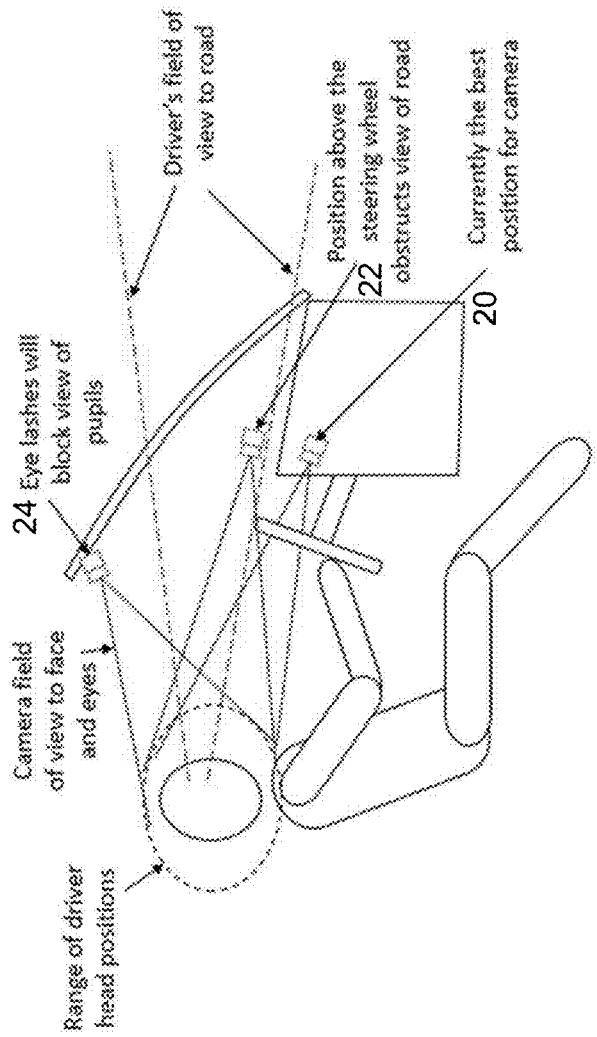
FIG. 2 is a plan view of typical locations for cameras in a typical driver monitoring system.
Figure 3:
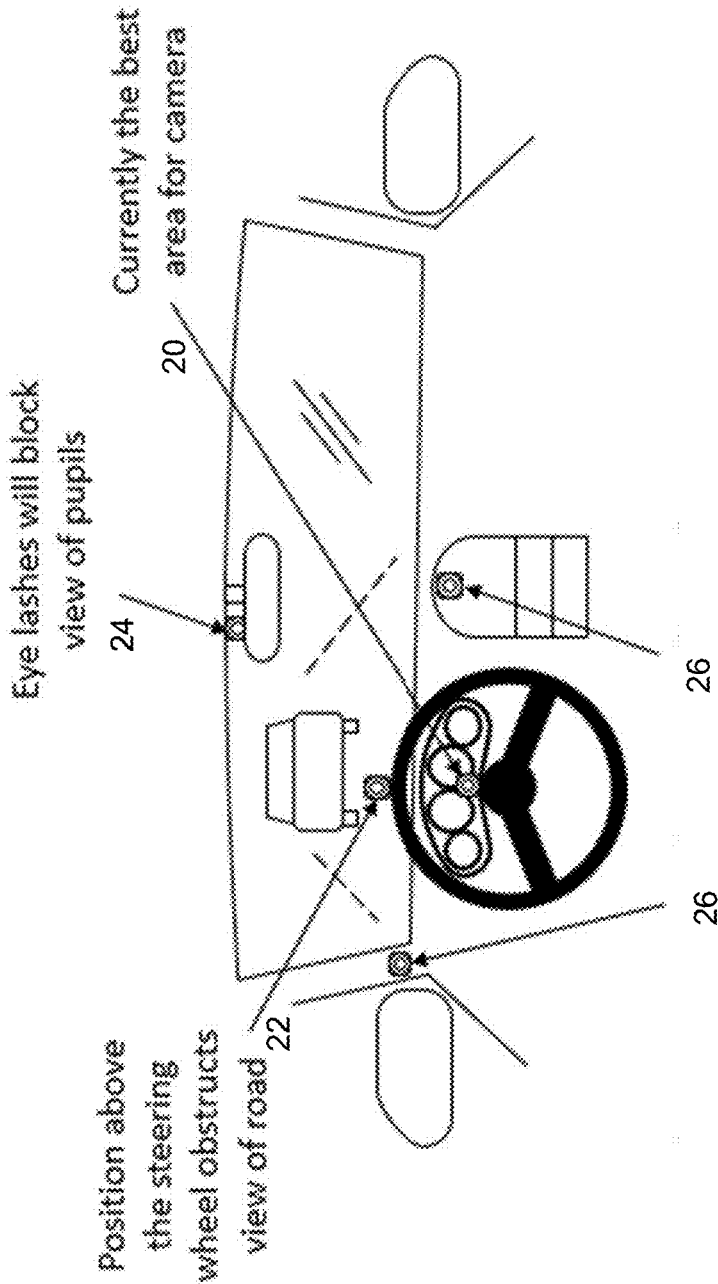
FIG. 3 is another plan view of typical locations for cameras in a typical driver monitoring system.

As shown in FIGS. 2 and 3, one of the most common positions for mounting cameras in a driver monitoring system is a position 20 near the instrument cluster where the driver has a view through the steering wheel opening. The camera is either placed on the steering column or in the dashboard somewhere near or within the instrument cluster. However, this creates issues because drivers often block the view of the camera (e.g., by placing a hand at the top of the steering wheel or turning the wheel 60 to 90 degrees). Steering column mounted systems have the additional challenge of needing to adjust cabin model calculations based on steering wheel tilt or extension changes. These column mounted systems need, for example, information from the vehicle about where the steering wheel position is and often require additional real-time calibration steps, for example using detected cabin features for reference, to reduce accumulated tolerances. Cameras mounted in a position 22 directly above the steering wheel will typically obstruct the driver's view while cameras mounted in a position 24 will not have a good view of the pupils of the driver (e.g., because the driver's eye lashes block the view). Other positions 26 (FIG. 3) may lose view of one or both of the eyes when the driver's head is turned.

Figure 4:
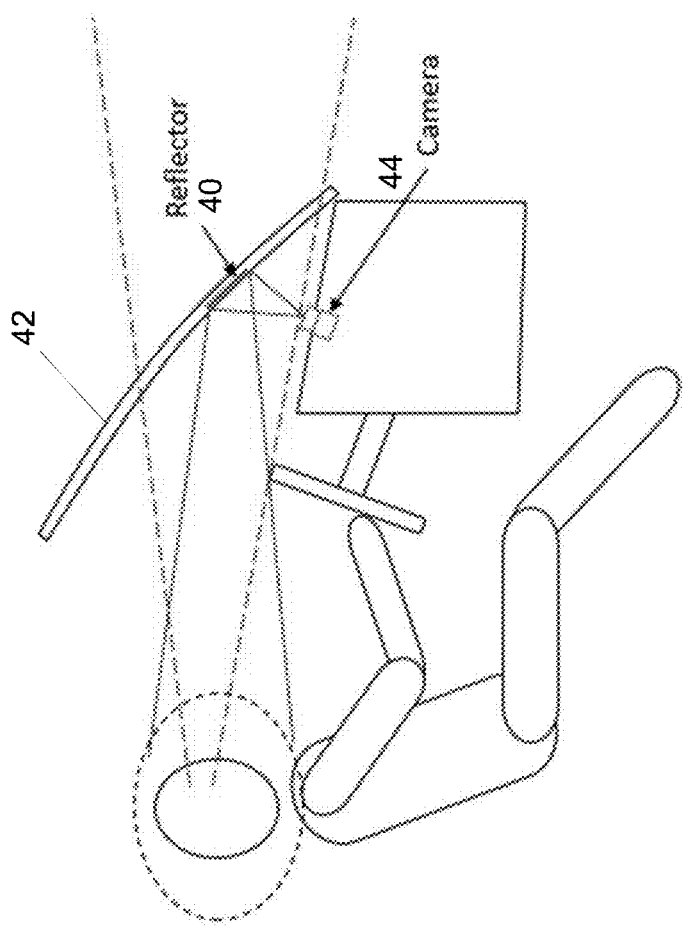
FIG. 4 is a plan view of the driver monitoring system in accordance with the present invention.
Figure 5:
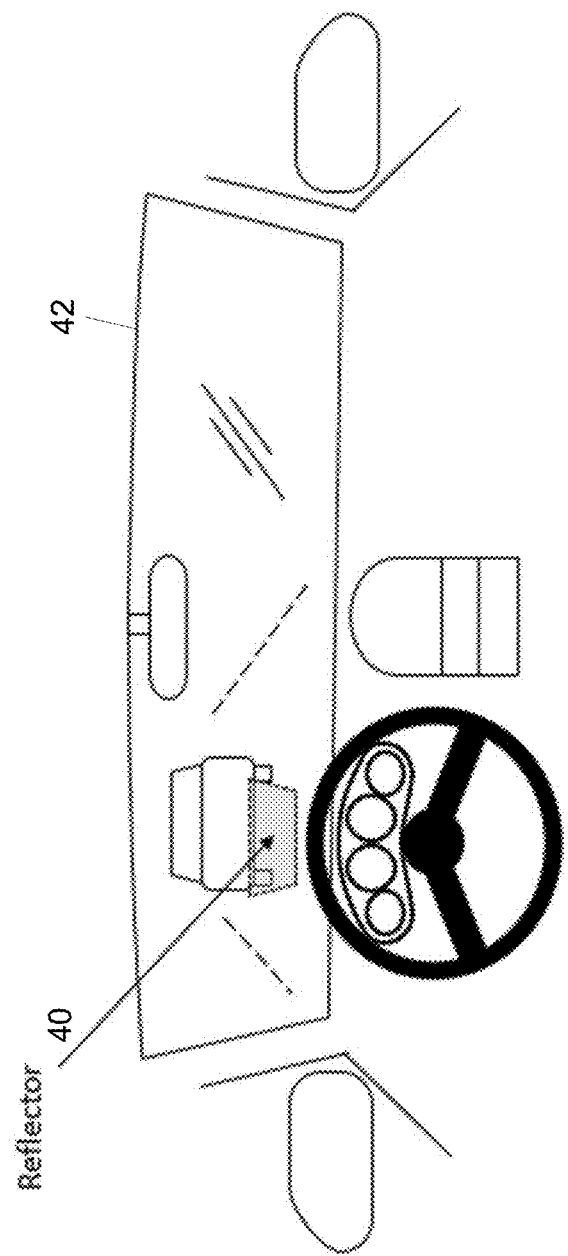
FIG. 5 is another plan view of the driver monitoring system of FIG. 4.

Referring now to FIG. 4, the driver monitoring system of the present invention includes a reflector 40 that is disposed, for example, at the in-cabin side of windshield glass 42. The reflector may be placed at different locations at the windshield depending on the vehicle. A camera 44 (or other imaging sensor) is disposed so that it captures a portion of the driver (e.g., the head or eyes) through the reflector. The reflector 40 and camera 44 are disposed so that there is a direct line of sight or optical path or light path (e.g., not blocked by the steering wheel or hand of the driver) between the camera and the driver's head region (via the reflector). The reflected camera view may be on or near the center of the driver so that both pupils are routinely visible for eye tracking. This view is also near the driver's line of sight to maximize the ability to see the pupils between the eyelids and eye lashes. Thus, the camera may be located entirely out of the sight of the driver. Curved (or otherwise non-flat) windshields may be compensated for a light path model or calibrated for per vehicle. The reflector 40 may be placed in other locations that allows for a consistent view of the portion of the driver to be monitored. FIG. 5 illustrates an exemplary position of the reflector 40 from a perspective of the driver of the vehicle.

Optionally, an infrared or near-infrared light emitting diode (LED) or other illumination source may be disposed in the vehicle (and such as at or near the camera) that directs IR/NIR light (or other non-visible light) toward the driver's head region, whereby the camera images the illuminated driver's head. The LED and camera may operate together when the driver monitoring system is operating. The illumination source may be disposed at the camera so that the light emitted by the illumination source, when energized or powered, reflects off the reflector toward the driver's head region so as to illuminate the driver's head region with IR/NIR light, or the illumination source may be disposed elsewhere in the vehicle and emit light generally directly toward the driver's head region.

Figure 6:
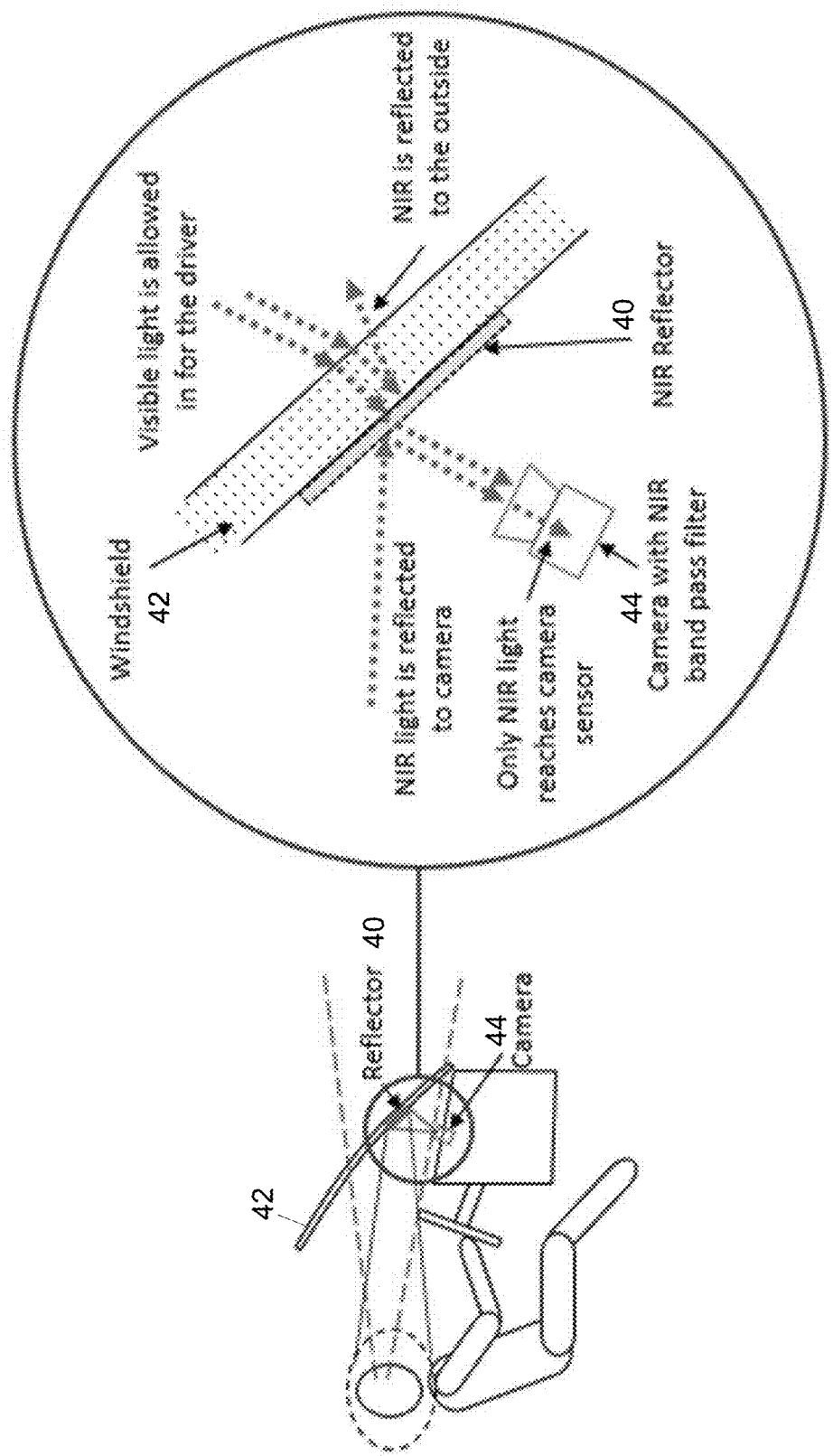
FIG. 6 is a plan view of the driver monitoring system of FIG. 4 with an enlarged portion detailing reflectivity of a reflector.

Referring now to FIG. 6, the reflector 40 may include glass or plastic that is coated with special optical coatings. The reflector may be attached directly to the windshield 42. In some examples, the reflector 40 is a special coating that is coated directly onto the inner surface of the windshield glass 42. The reflector 40 may reflect, for example, near-infrared (NIR) light while allowing visible light to pass through unchanged. The system 12 may include one or more non-visible light illumination sources, such as a NIR illumination LEDs, which illuminate the portion of the driver or other occupant (e.g., eyes, head) that is to be monitored. The non-visible nature of the emitted light ensures that the driver is not distracted by visible illuminations. The reflector 40 may then direct (i.e., reflect) this interior emitted light from the face of the driver into the camera 44. The reflector 40 may also reflect outside NIR light (or other non-visible light) away from the view of the camera so that the NIR light present in the external ambient light (or other external light source(s) that may be near the vehicle) does not interfere with the viewing system. Visible light from the outside may then pass through the reflector 40 so that the driver has an unobstructed view through the windshield 42. The camera 44 may have an NIR band pass filter so that only the reflected interior NIR light reaches the sensor (i.e., a band pass filter that blocks or attenuates light outside of a spectral band that includes wavelengths of the light emitted by the illumination source). Other non-visible portions of the spectrum besides NIR may also be used and the illumination source, reflector 40, and camera 44 may be adjusted or selected accordingly.

Figure 7:
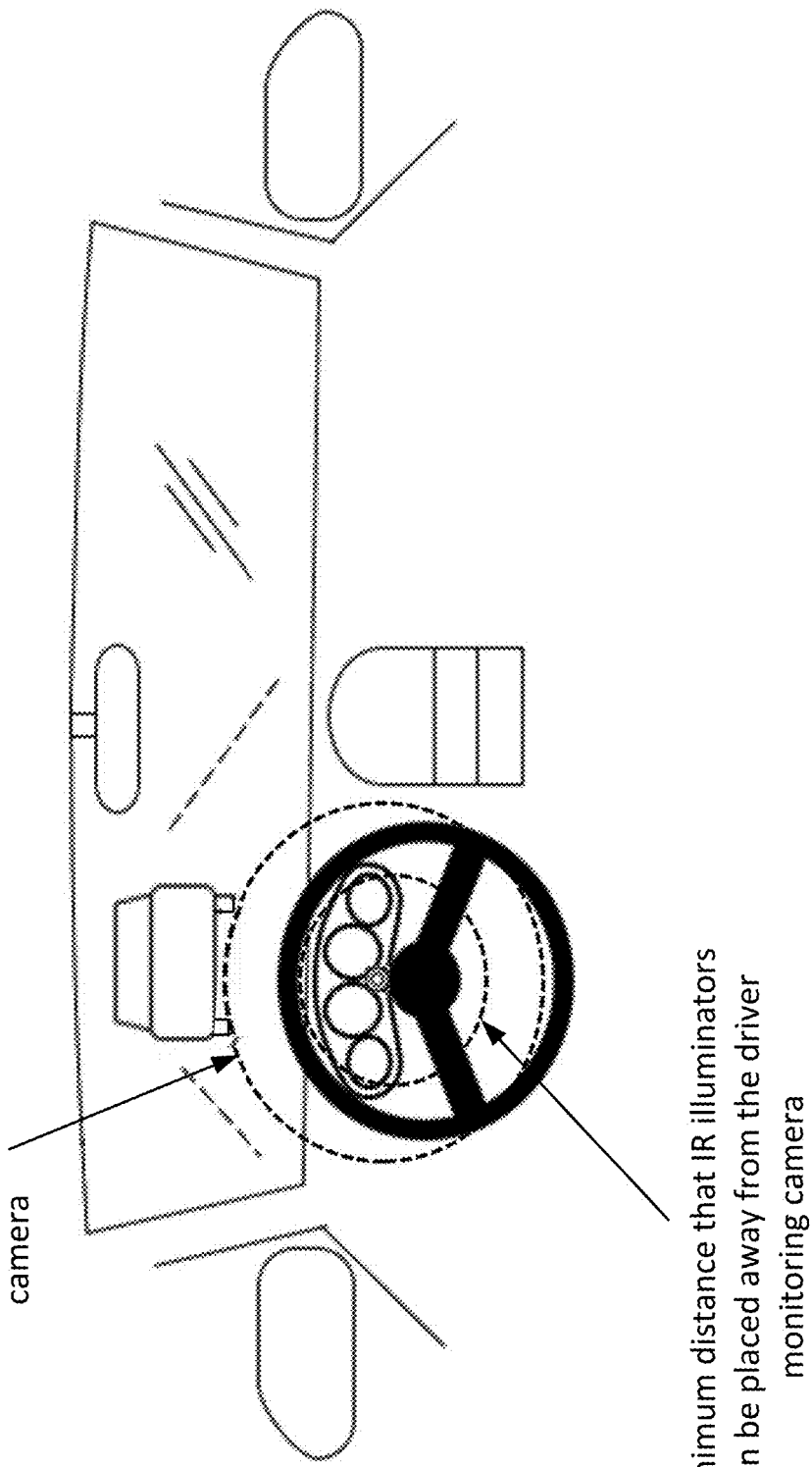
FIG. 7 is a plan view of required locations for an infrared illuminator around a camera disposed at the dashboard or steering wheel and directly viewing the driver's head region of a typical driver monitoring system.

Referring now to FIG. 7, driver monitoring systems frequently determine where the driver's eyes are aimed by directing IR light from an IR illuminator towards the driver and referencing the position of illuminator reflection points (e.g., off the cornea sphere of one or both eyes of the driver). That is, light emitted by the IR illuminator reflects off the cornea sphere(s) of the driver and creates illuminator reflection points that may be detected. To successfully accomplish this, typically the IR illuminator must be within a set range around the camera (such as a camera disposed at the dashboard or instrument panel or at or near the center of the steering wheel) such that the angle created from the eyes to the illuminator and camera lens is within a selected or threshold angle. Thus, as illustrated in FIG. 7, a maximum distance that the IR illuminator may be placed and a minimum distance that the IR illuminator may be placed (i.e., a typical allowable range for IR illuminator placement around the steering column mounted camera) substantially limits the potential areas at which the IR illuminator may be placed in typical driver monitoring systems.

Figure 8:
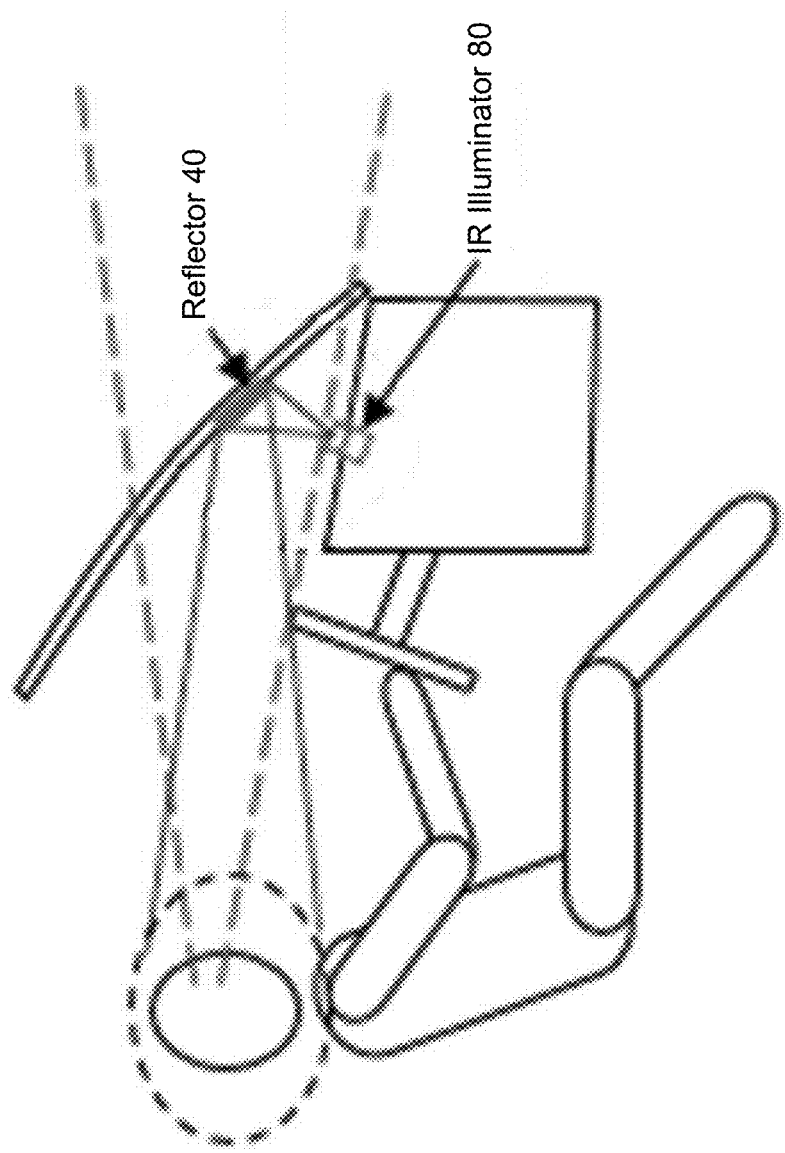
FIG. 8 is a plan view of an infrared illuminator and reflector of the driver monitoring system in accordance with the present invention.

Referring now to FIG. 8, in some implementations, the IR wavelength illuminator(s) 80 may be placed so to reflect off the windshield reflector 40 (as with the camera 44). This allows for flexibility in the placement of the illuminator 40 (e.g., placement on top of the instrument panel) and away from directly around the steering wheel and controls. The IR illuminator is positioned at or near the camera and relative to the reflector such that the angle created from the eyes to the illuminator and to the camera lens (also positioned at an angle relative to the reflector) is within a selected or threshold angle that may be greater than 5 or 5-8 degrees and less than 30 or 25-30 degrees. The threshold angle is important, as when the angle is too small, the illuminator light enters the eyes causing the entire pupil to appear illuminated. This diminishes the contrast with the illuminator refection points. When the angle is too large, the illuminator reflection point may be off the cornea sphere entirely. Additionally, when the IR illuminator is placed too high or low relative to the driver's eyes, the driver's eye lids or eye lashes may block the light. By placing the illuminator at the instrument panel and directing its light toward the reflector, the illuminator can be placed at a variety of locations laterally across the instrument panel and forward or rearward, while still providing the appropriately angled illumination (via the reflector) at the driver's eyes.

The position and angle of the illumination source and the position of the reflector may be selected based on an angle of the windshield and the position and angle of the illuminator in order to ensure that the light emitted by the light source reflects off the reflector and toward the driver's head region so that a principal axis of the reflected light (as reflected toward the region to be illuminated, e.g., the driver's head region) hits/impinges the driver's eyes within a threshold angle range (e.g., 5-30 degrees) relative to the principal axis of the driver's forward view or field of view (which is typically generally horizontal when the driver views through the windshield and forward of the vehicle. Thus, the reflector may be positioned higher or lower at the windshield depending on the location and angle of the light source and the angle of the windshield so as to direct the light path toward the driver's eyes (or other portion of the driver to illuminate) within the threshold angle range.

Figure 9:
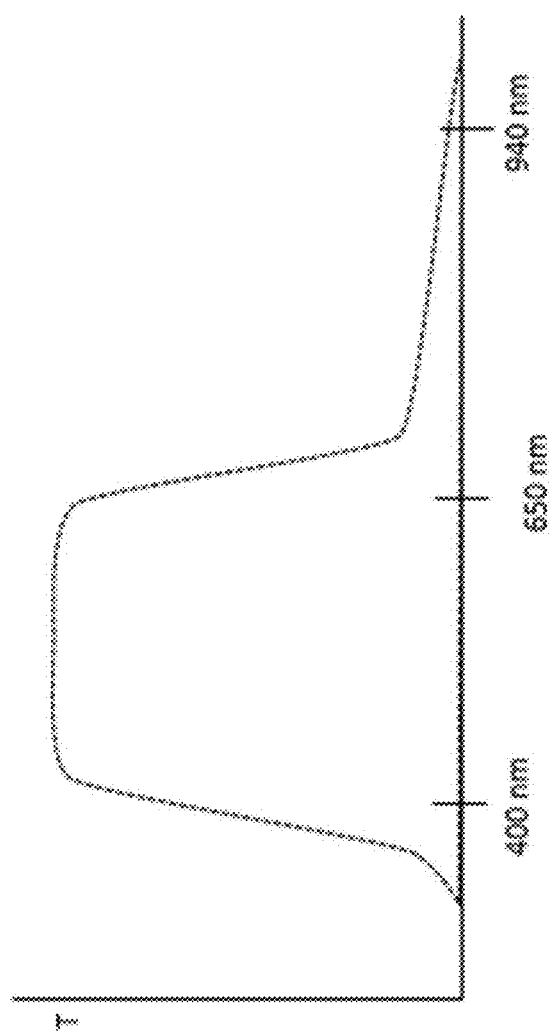
FIG. 9 is a plot of reflectivity of the reflector of FIG. 6.

Optionally, and desirably, the reflector 40 reflects non-visible light and allows visible light to pass through. That is, the reflector's reflectivity of the operating wavelength of the driver monitoring camera 44 is at or approaching 100 percent. In other words, the reflector's transmissivity of the operating wavelength is at or near zero. The operating wavelength, as discussed above, may be at NIR range (e.g., around 700 nm to around 940 nm). The transmission spectra of the reflector 40 may reflect the operating wavelength and transmit the other wavelength especially in visible spectrum. By such design, the driver may see through the reflector 40 without being visually blocked by the reflector allowing unimpeded views of the vehicle's surroundings (e.g., the road). FIG. 9 illustrates an example transmission spectrum of such reflector 40. When the reflector 40 is a separate piece of glass or plastic, both surfaces may be coated with an optical coating. It is understood that when the reflector's transmissivity is at its lowest, the reflectivity is at its highest.

Figure 10:
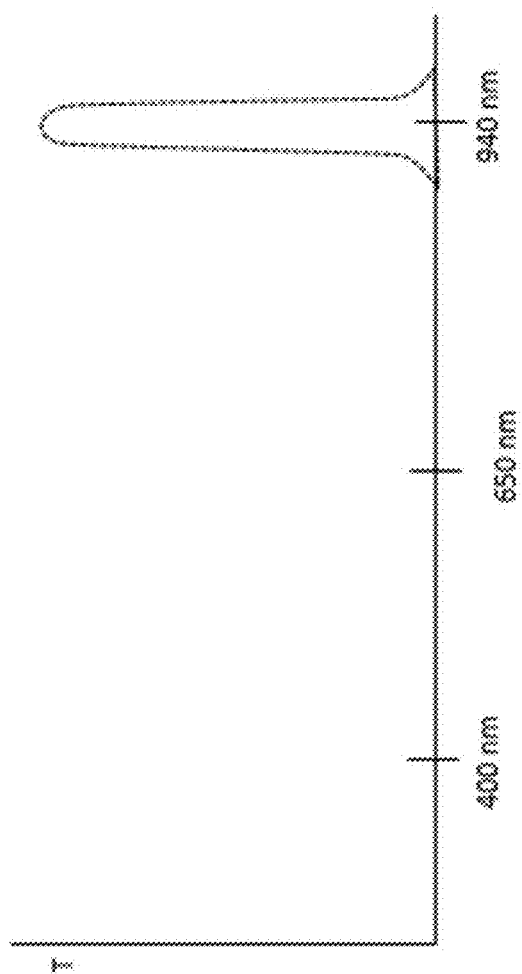
FIG. 10 is a plot of a bandpass filter of the camera of FIG. 6.

Inside the lens of the camera 44 (or other imaging sensor), there may be an optical filter that allows in the operating wavelength and blocks most or all other wavelengths. Thus, only, for example, the NIR light emitted from the illuminator(s) and reflected from a portion of the driver enters into the optical path of the camera 44 and allows for capturing image data of the illuminated portion of the driver. Light rays in all spectrum ranges except for the operating wavelength may be blocked by the optical filter in the camera lens. For example, as shown in FIG. 10, an optical filter (or bandpass filter) may reject all light except for light at or near 940 nm (when 940 nm is the principal operating wavelength of the system 12), such as light or radiation in a range of 900 to 980 nm or thereabouts.

Thus, the system uses a non-visible light emitting illumination source, a reflector, and a camera to monitor, for example, the head and/or eyes of a driver of a vehicle. The non-visible light reflects off a portion of the driver of the vehicle. The reflected non-visible light that is incident at the reflector reflects off the reflector so as to be within view of the camera. The camera, based on the non-visible light emitted by the illumination source and reflected off the driver and reflected off the reflector, captures image data representative of the illuminated portion of the driver. Responsive to processing of the captured image data, the illuminated portion (e.g., the eyes of the driver) are monitored. Using the reflective properties of the reflector, the camera may be placed completely out of sight of the driver. The system may, for example, determine the general viewing direction of the driver, the focal distance of the driver's gaze, or alertness of the driver.

The driver monitoring system may utilize aspects of head and face direction and position tracking systems and/or eye tracking systems and/or gesture recognition systems. Such head and face direction and/or position tracking systems and/or eye tracking systems and/or gesture recognition systems may utilize aspects of the systems described in U.S. Pat. No. 9,405,120 and/or U.S. Publication Nos. US-2017-0274906; US-2016-0209647; US-2016-0137126; US-2015-0352953; US-2015-0296135; US-2015-0294169; US-2015-0232030; US-2015-0092042; US-2015-0022664; US-2015-0015710; US-2015-0009010 and/or US-2014-0336876, which are hereby incorporated herein by reference in their entireties.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The imaging device and control and image processor and any associated illumination source, if applicable, may comprise any suitable components, and may utilize aspects of the cameras (such as various imaging sensors or imaging array sensors or cameras or the like, such as a CMOS imaging array sensor, a CCD sensor or other sensors or the like) and vision systems described in U.S. Pat. Nos. 5,760,962; 5,715,093; 6,922,292; 6,757,109; 6,717,610; 6,590,719; 6,201,642; 5,796,094; 6,559,435; 6,831,261; 6,822,563; 6,946,978; 7,720,580; 8,542,451; 7,965,336; 7,480,149; 5,877,897; 6,498,620; 5,670,935; 5,796,094; 6,396,397; 6,806,452; 6,690,268; 7,005,974; 7,937,667; 7,123,168; 7,004, 606; 6,946,978; 7,038,577; 6,353,392; 6,320,176; 6,313,454 and/or 6,824,281, and/or International Publication Nos. WO 2009/036176; WO 2009/046268; WO 2010/099416; WO 2011/028686 and/or WO 2013/016409, and/or U.S. Publication Nos. US 2010-0020170 and/or US-2009-0244361, which are all hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A driver monitoring system for monitoring a driver of a vehicle, the driver monitoring system comprising:
    an illumination source disposed at a vehicle equipped with the driver monitoring system, wherein the illumination source emits non-visible light that illuminates at least a portion of a driver of the vehicle;
    a reflector disposed at a windshield of the vehicle, wherein the reflector reflects non-visible light incident at the reflector, and wherein the reflector allows visible light incident at the reflector to pass through the reflector;
    a camera disposed at an interior of the vehicle and having a field of view that encompasses the reflector;
    a control comprising circuitry and associated software;
    wherein the circuitry of the control comprises an image processor for processing image data captured by the camera;
    wherein the illumination source emits non-visible light that reflects off the illuminated portion of the driver of the vehicle;
    wherein non-visible light emitted by the illumination source that is reflected off the illuminated portion of the driver and that is incident at the reflector reflects off the reflector to as to be within the field of view of the camera;
    wherein, based on the non-visible light emitted by the illumination source and reflected off the illuminated portion of the driver and reflected off the reflector, the camera captures image data representative of the illuminated portion of the driver;
    wherein, responsive to processing by the image processor of image data captured by the camera, the illuminated portion of the driver is monitored;
    wherein the non-visible light emitted by the illumination source reflects off of the reflector prior to illuminating the illuminated portion of the driver of the vehicle;
    wherein the illuminated portion of the driver includes at least eyes of the driver, and wherein the illumination source is located at the instrument panel of the vehicle, and wherein the non-visible light emitted by the illumination source reflects off the reflector and toward the eyes of the driver of the vehicle at an angle relative to a viewing direction of the driver, and wherein the angle is greater than 5 degrees and less than 30 degrees; and
    wherein the angle of the reflected light relative to the illuminated portion of the driver is the angle between (i) an optical path between the reflector and the eyes of the driver and (ii) a principal axis of a forward view of the driver through the windshield of the vehicle.

2. The driver monitoring system of claim 1, wherein the driver, during operation of the vehicle, has an unobstructed forward view through the reflector and through the windshield.

3. The driver monitoring system of claim 1, wherein the reflector comprises at least one selected from the group comprising (i) glass coated with at least one optical coating and (ii) plastic coated with at least one optical coating, and wherein the at least one optical coating reflects at least some non-visible light incident thereon while allowing visible light to pass therethrough.

4. The driver monitoring system of claim 1, wherein the illumination source emits near-infrared (NIR) light.

5. The driver monitoring system of claim 4, wherein the illumination source emits near-infrared (NIR) light having wavelength between 750 nm and 940 nm.

6. The driver monitoring system of claim 1, wherein the camera comprises a bandpass filter that allows the non-visible light emitted by the illumination source to pass through and be captured by the camera and attenuates visible light from being captured by the camera.

7. The driver monitoring system of claim 6, wherein the bandpass filter passes non-visible light having wavelength between 900 nm and 980 nm and attenuates light having wavelength less than 900 nm and greater than 980 nm.

8. The driver monitoring system of claim 1, wherein the reflector reflects at least some non-visible light incident thereon that originates from outside of the vehicle away from the camera.

9. The driver monitoring system of claim 1, wherein, responsive to processing by the image processor of image data captured by the camera, the eyes of the driver are tracked.

10. A driver monitoring system for monitoring a driver of a vehicle, the driver monitoring system comprising:
    an illumination source disposed at a vehicle equipped with the driver monitoring system, wherein the illumination source emits non-visible light that illuminates at least a portion of a driver of the vehicle;
    a reflector disposed at a windshield of the vehicle, wherein the reflector reflects non-visible light incident at the reflector, and wherein the reflector allows visible light incident at the reflector to pass through the reflector;
    wherein the driver, during operation of the vehicle, has an unobstructed forward view through the reflector and through the windshield;
    a camera disposed at an interior of the vehicle and having a field of view that encompasses the reflector;
    wherein the illumination source emits non-visible light having wavelength between 900 nm and 980 nm;
    wherein the camera comprises a bandpass filter that passes non-visible light having wavelength between 900 nm and 980 nm and attenuates light having wavelength less than 900 nm and greater than 980 nm;
    a control comprising circuitry and associated software;
    wherein the circuitry of the control comprises an image processor for processing image data captured by the camera;
    wherein the illumination source emits non-visible light that reflects off the illuminated portion of the driver of the vehicle;
    wherein non-visible light emitted by the illumination source that is reflected off the illuminated portion of the driver and that is incident at the reflector reflects off the reflector so as to be within the field of view of the camera;
    wherein, based on the non-visible light emitted by the illumination source and reflected off the illuminated portion of the drive rand reflected off the reflector, the camera captures image data representative of the illuminated portion of the driver;

wherein, responsive to processing by the image processor of image data captured by the camera, the illuminated portion of the driver is monitored;

wherein the non-visible light emitted by the illumination source reflects off of the reflector prior to illuminating the illuminated portion of the driver of the vehicle;

wherein the illuminated portion of the driver includes at least the eyes of the driver, and wherein the illumination source is located at the instrument panel of the vehicle, and wherein the non-visible light emitted by the illumination source reflects off the reflector and toward the eyes of the driver of the vehicle at an angle relative to a viewing direction of the driver, and wherein the angle is greater than 5 degrees and less than 30 degrees; and wherein the angle of the reflected light relative to the illuminated portion of the driver is the angle between (i) an optical path between the reflector and the eyes of the driver and (ii) a principal axis of a forward view of the driver through the windshield of the vehicle.

11. The driver monitoring system of claim 10, wherein the reflector comprises at least one selected from the group comprising (i) glass coated with at least one optical coating and (ii) plastic coated with at least one optical coating, and wherein the at least one optical coating reflects at least some non-visible light incident thereon while allowing visible light to pass therethrough.

12. The driver monitoring system of claim 10, wherein the reflector reflects at least some non-visible light incident thereon that originates from outside of the vehicle away from the camera.

13. The driver monitoring system of claim 10, wherein, responsive to processing by the image processor of image data captured by the camera, the eyes of the driver are tracked.

14. A driver monitoring system for monitoring a driver of a vehicle, the driver monitoring system comprising:

an illumination source disposed at a vehicle equipped with the driver monitoring system, wherein the illumination source emits non-visible light that illuminates at least a portion of a driver of the vehicle, and wherein the illuminated portion of the driver includes at least eyes of the driver;

a reflector disposed at a windshield of the vehicle, wherein the reflector reflects non-visible light incident at the reflector, and wherein the reflector allows visible light incident at the reflector to pass through the reflector;

wherein the driver, during operation of the vehicle, has an unobstructed forward view through the reflector and through the windshield;

a camera disposed at an interior of the vehicle and having a field of view that encompasses the reflector;

a control comprising circuitry and associated software;

wherein the circuitry of the control comprises an image processor for processing image data captured by the camera;

wherein the illumination source is located at the instrument panel of the vehicle, and wherein the non-visible light emitted by the illumination source reflects off the reflector and toward the eyes of the driver of the vehicle at an angle relative to a viewing direction of the driver;

wherein the angle of the reflected light relative to the illuminated portion of the driver is the angle between (i) an optical path between the reflector and the eyes of the driver and (ii) a principal axis of a forward view of the driver through the windshield of the vehicle;

wherein the angle is greater than 5 degrees and less than 30 degrees;

wherein non-visible light emitted by the illumination source that is reflected off the eyes of the driver and that is incident at the reflector reflects off the reflector so as to be within the field of view of the camera;

wherein, based on the non-visible light emitted by the illumination source and reflected off the eyes of the driver and reflected off the reflector, the camera captures image data representative of the eyes of the driver; and wherein, responsive to processing by the image processor of image data captured by the camera, the eyes of the driver are monitored.

15. The driver monitoring system of claim 14, wherein the reflector comprises at least one selected from the group comprising (i) glass coated with at least one optical coating and (ii) plastic coated with at least one optical coating, and wherein the at least one optical coating reflects at least some non-visible light incident thereon while allowing visible light to pass therethrough.

16. The driver monitoring system of claim 14, wherein the reflector reflects at least some non-visible light incident thereon that originates from outside of the vehicle away from the camera.

17. The driver monitoring system of claim 14, wherein the illumination source emits non-visible light having wavelength between 900 nm and 980 nm, and wherein the camera comprises a bandpass filter that passes non-visible light having wavelength between 900 nm and 980 nm and attenuates light having wavelength less than 900 nm and greater than 980 nm.

* * * * *

UNITED STATES PATENT AND TRADEMARK OFFICE
CERTIFICATE OF CORRECTION

PATENT NO. : 11,341,671 B2
APPLICATION NO. : 16/668035
DATED : May 24, 2022
INVENTOR(S) : Yuesheng Lu et al.

It is certified that error appears in the above-identified patent and that said Letters Patent is hereby corrected as shown below:

In the Claims

Column 7
Line 38, Claim 1, "reflector to as" should be --reflector so as--

Column 8
Line 67, Claim 10, "drive rand" should be --driver and--

Signed and Sealed this
Twenty-eighth Day of June, 2022

Katherine Kelly Vidal
*Director of the United States Patent and Trademark Office*